United States Patent
Horn et al.

(10) Patent No.: US 9,699,688 B2
(45) Date of Patent: Jul. 4, 2017

(54) METHOD FOR SCHEDULING ORTHOGONALLY OVER MULTIPLE HOPS

(75) Inventors: Gavin Bernard Horn, San Diego, CA (US); Ashwin Sampath, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1034 days.

(21) Appl. No.: 11/832,847

(22) Filed: Aug. 2, 2007

(65) Prior Publication Data
US 2009/0036138 A1 Feb. 5, 2009

(51) Int. Cl.
| | |
|---|---|
| H04W 72/00 | (2009.01) |
| H04W 28/16 | (2009.01) |
| H04L 12/54 | (2013.01) |
| H04L 12/911 | (2013.01) |
| H04L 1/00 | (2006.01) |
| H04W 28/18 | (2009.01) |

(52) U.S. Cl.
CPC ......... *H04W 28/16* (2013.01); *H04L 12/5695* (2013.01); *H04L 47/824* (2013.01); *H04L 1/0002* (2013.01); *H04L 1/0026* (2013.01); *H04W 28/18* (2013.01)

(58) Field of Classification Search
CPC .... H04W 28/16; H04W 28/18; H04L 1/0002; H04L 1/0026; H04L 12/5695; H04L 47/824
USPC .................. 455/450, 451, 452.1, 451.2, 453
See application file for complete search history.

(56) References Cited

U.S. PATENT DOCUMENTS

| | | | |
|---|---|---|---|
| 4,675,774 A | 6/1987 | Gonnam et al. | |
| 7,031,293 B1 | 4/2006 | Srikrishna et al. | |
| 7,079,534 B1 * | 7/2006 | Medhat et al. | 370/389 |
| 7,106,707 B1 | 9/2006 | Strutt | |
| 7,489,932 B2 | 2/2009 | Chari et al. | |
| 7,620,370 B2 | 11/2009 | Barak et al. | |
| 7,974,240 B2 * | 7/2011 | Liu et al. | 370/329 |

(Continued)

FOREIGN PATENT DOCUMENTS

| | | |
|---|---|---|
| DE | 10027115 | 12/2001 |
| EP | 1788759 | 5/2007 |

(Continued)

OTHER PUBLICATIONS

European Search Report—EP08006548, European Search Authority—Berlin—Dec. 18, 2008.

(Continued)

*Primary Examiner* — Anthony Addy
*Assistant Examiner* — Matthew Genack
(74) *Attorney, Agent, or Firm* — Changwoo Yang

(57) ABSTRACT

Apparatus and method for supporting wireless downlink and uplink connections. In the downlink direction, an apparatus receives from the downlink node a request to communicate using an allocation of radio resources specified by the downlink node, and transmits to the downlink node a grant to communicate using at least a portion of the specified allocation of radio resources. In the uplink direction, the apparatus sends a request to a downlink node to communicate using a specified allocation of radio resources, and receives from the downlink node a grant to communicate using at least a portion of the specified allocation of radio resources.

80 Claims, 7 Drawing Sheets

(56) References Cited

U.S. PATENT DOCUMENTS

| | | | |
|---|---|---|---|
| 2002/0106002 A1* | 8/2002 | Sun et al. | 375/130 |
| 2004/0005861 A1 | 1/2004 | Tauchi | |
| 2005/0169178 A1 | 8/2005 | Gupta et al. | |
| 2006/0209671 A1 | 9/2006 | Khan et al. | |
| 2007/0105573 A1 | 5/2007 | Gupta et al. | |
| 2007/0105574 A1 | 5/2007 | Gupta et al. | |
| 2007/0109954 A1 | 5/2007 | Pasanen et al. | |
| 2007/0109989 A1* | 5/2007 | Nakagawa et al. | 370/328 |
| 2007/0197161 A1 | 8/2007 | Walke et al. | |
| 2007/0297366 A1 | 12/2007 | Osann | |
| 2008/0025248 A1 | 1/2008 | Naden | |
| 2008/0045174 A1 | 2/2008 | Chen et al. | |
| 2008/0084877 A1 | 4/2008 | Brzozowski | |
| 2008/0108369 A1 | 5/2008 | Visotsky et al. | |
| 2008/0188231 A1 | 8/2008 | Zhu et al. | |
| 2008/0225737 A1* | 9/2008 | Gong et al. | 370/252 |
| 2008/0268855 A1* | 10/2008 | Hanuni et al. | 455/445 |
| 2009/0034458 A1 | 2/2009 | Horn et al. | |
| 2009/0052322 A1 | 2/2009 | Simonsson et al. | |
| 2009/0080366 A1 | 3/2009 | Shao et al. | |
| 2009/0252065 A1 | 10/2009 | Zhang et al. | |
| 2009/0258639 A1 | 10/2009 | Nystrom et al. | |
| 2009/0285121 A1* | 11/2009 | Tzannes | 370/254 |
| 2009/0296668 A1* | 12/2009 | Capone et al. | 370/337 |
| 2010/0046413 A1* | 2/2010 | Jin et al. | 370/315 |
| 2010/0227620 A1 | 9/2010 | Naden et al. | |
| 2010/0279603 A1 | 11/2010 | Horiuchi et al. | |
| 2010/0315956 A1 | 12/2010 | Nakao et al. | |

FOREIGN PATENT DOCUMENTS

| | | |
|---|---|---|
| JP | 5259956 A | 10/1993 |
| JP | 2005026816 A | 1/2005 |
| JP | 2005538574 A | 12/2005 |
| JP | 2007143158 A | 6/2007 |
| TW | I274490 B | 2/2007 |
| WO | 2005018115 | 2/2005 |
| WO | 2007003333 A1 | 1/2007 |
| WO | 2007051148 A2 | 5/2007 |
| WO | 2007051152 A2 | 5/2007 |
| WO | 2007053954 | 5/2007 |

OTHER PUBLICATIONS

International Search Report—PCT/US08/071909, International Search Authority—European Patent Office—Jan. 5, 2009.

Written Opinion—PCT/US08/071909, International Search Authority—European Patent Office—Jan. 5, 2009.

Comstock D., et.al., "A Flexible Multi-hop Frame Structure for IEEE 802.16j", IEEE 802.16 Broadband Wireless Access Working Group Contribution, U.S.A., IEEE, Nov. 8, 2006, IEEE C802.16j-06_163, P.0-10, http://www.ieee802.org/16/relay/contrib/C80216j-06_163.pdf.

Taiwan Search Report—TW097129444—TIPO—Aug. 27, 2012.

* cited by examiner

METHOD FOR SCHEDULING ORTHOGONALLY OVER MULTIPLE HOPS

BACKGROUND

Field

The present disclosure relates generally to wireless communications, and more specifically but not exclusively to various techniques for scheduling orthogonally over multiple hops in a wireless network.

Background

Wireless networks are widely deployed to provide various services to consumers, such as telephony, data, video, audio, messaging, broadcasts, etc. Wireless networks enable broadband communications over a regional, nationwide, or even global region. Such networks are sometimes referred as Wireless Wide Area Networks (WWANs). One common example of a WWAN is a cellular network that supports CDMA2000, a telecommunications standard that uses Code Division Multiple Access (CDMA) to send voice, data, and signaling between mobile subscribers. Another example of a WWAN is a cellular network that provides broadband Internet access to mobile subscribers, such as Evolution-Data Optimized (EV-DO) or Ultra Mobile Broadband (UMB), both of which are part of the CDMA2000 family of air interface standards. These cellular networks generally provide coverage over multiple cellular regions, with a fixed-site base station located in each cell to serve mobile subscribers.

Smaller wireless networks known as Wireless Local Area Networks (WLANs) have been standardized, for example by the IEEE 802.11 committee. WLANs are deployed to cover small areas with a geographic coverage ranging from a few tens of meters to a few hundred meters. A WLAN uses unlicensed spectrum to provide access to a network, typically covering only the network operator's own property. By way of example, many coffee shops, hotels, and transportation hubs contain WLAN access points to the Internet.

Currently, ad-hoc wireless networks are being deployed to provide long range wireless communications for voice, data, audio, video, messaging, and multimedia (i.e., content). An ad-hoc wireless network is formed by a number of wireless nodes that join together to provide backhaul services to other wireless nodes. In an ad-hoc wireless network, content is routed from one wireless node to another until the content reaches its destination. A continuous connection is provided to the destination through one or more intermediate nodes, which may be dynamically reconfigured to maintain a connection when one or more wireless nodes in the ad-hoc network becomes unavailable.

Ad-hoc wireless networks provide a unique opportunity to expand the wireless coverage currently offered by existing infrastructures. By way of example, an ad-hoc wireless network may be used to expand the geographic reach of a cellular network or a WLAN. An ad-hoc wireless network also provides an attractive alternative to cable and Digital Subscriber Lines (DSLs) for broadband access.

With the recent advent of ad-hoc wireless networks and the vast potential for improving wireless communications, more efficient ways are needed to support the transmission of content through these networks.

SUMMARY

In one aspect of the disclosure, a method of wireless communications includes receiving from a downlink node a request to communicate using an allocation of radio resources specified by the downlink node, and transmitting to the downlink node a grant to communicate using at least a portion of the specified allocation of radio resources.

In another aspect of the disclosure, a method a wireless communications includes sending a request to the uplink node to communicate using a specified allocation of radio resources, and receiving from the uplink node a grant to communicate using at least a portion of the specified allocation of radio resources.

In a further aspect of the disclosure, an apparatus for wireless communications includes a media access controller configured to receive from the downlink node a request to communicate using an allocation of radio resources specified by the downlink node, and transmit to the downlink node a grant to communicate using at least a portion of the specified allocation of radio resources.

In yet another aspect of the disclosure, an apparatus for wireless communications includes a media access controller configured to send a request to the uplink node to communicate using a specified allocation of radio resources, and receive from the uplink node a grant to communicate using at least a portion of the specified allocation of radio resources.

In still yet another aspect of the disclosure, an apparatus for wireless communications includes means for receiving from the downlink node a request to communicate using an allocation of radio resources specified by the downlink node, and means for transmitting to the downlink node a grant to communicate using at least a portion of the specified allocation of radio resources.

In yet a further aspect of the disclosure, an apparatus for wireless communications includes means for sending a request to the uplink node to communicate using a specified allocation of radio resources, and means for receiving from the uplink node a grant to communicate using at least a portion of the specified allocation of radio resources.

In still yet another aspect of the disclosure, a computer-program product for wireless communications includes a machine-readable medium having instructions executable by a one or more processors in a wireless node to receive from the downlink node a request to communicate using an allocation of radio resources specified by the downlink node, and transmit to the downlink node a grant to communicate using at least a portion of the specified allocation of radio resources.

In a further aspect of the disclosure, a computer-program product for wireless communications includes a machine-readable medium having instructions executable by a processing system in a wireless node to send a request to the uplink node to communicate using a specified allocation of radio resources, and receive from the uplink node a grant to communicate using at least a portion of the specified allocation of radio resources.

In yet a further aspect of the disclosure, a relay point includes a wireless network adapter configured to support radio communications with a downlink node, and a media access controller configured to receive from the downlink node a request to communicate using an allocation of radio resources specified by the downlink node, and transmit to the downlink node a grant to communicate using at least a portion of the specified allocation of radio resources.

In another aspect of the disclosure, an access point includes a network adapter configured to support a wired backhaul connection to a network and radio communications with a downlink node, and a media access controller configured to receive from the downlink node a request to communicate using an allocation of radio resources specified by the downlink node, and transmit to the downlink node a grant to communicate using at least a portion of the specified allocation of radio resources.

In yet another aspect of the disclosure, a relay point includes a wireless network adapter configured to support radio communications with an uplink node, and a media access controller configured to send a request to the uplink node to communicate using a specified allocation of radio resources, and receive from the uplink node a grant to communicate using at least a portion of the specified allocation of radio resources.

In still yet another aspect of the disclosure, an access terminal includes a wireless network adapter configured to support radio communications with an uplink node, a media access controller configured to send a request to the uplink node to communicate using a specified allocation of radio resources, and receive from the uplink node a grant to communicate using at least a portion of the specified allocation of radio resources, and a user interface configured to control content to and from the wireless network adapter.

It is understood that other aspects of the invention will become readily apparent to those skilled in the art from the following detailed description, wherein various aspects of the invention are shown and described by way of illustration. As will be realized, the invention is capable of other and different configurations and implementations and its several details are capable of modification in various other respects, all without departing from the scope of this disclosure. Accordingly, the drawings and detailed description are to be regarded as illustrative in nature and not as restrictive.

DETAILED DESCRIPTION

The detailed description set forth below in connection with the appended drawings is intended as a description of various configurations of the invention and is not intended to represent the only configurations in which the invention may be practiced. The detailed description includes specific details for the purpose of providing a thorough understanding of the invention. However, it will be apparent to those skilled in the art that the invention may be practiced without these specific details. In some instances, well-known structures and components are shown in block diagram form in order to avoid obscuring the concepts of the invention.

Figure 1:
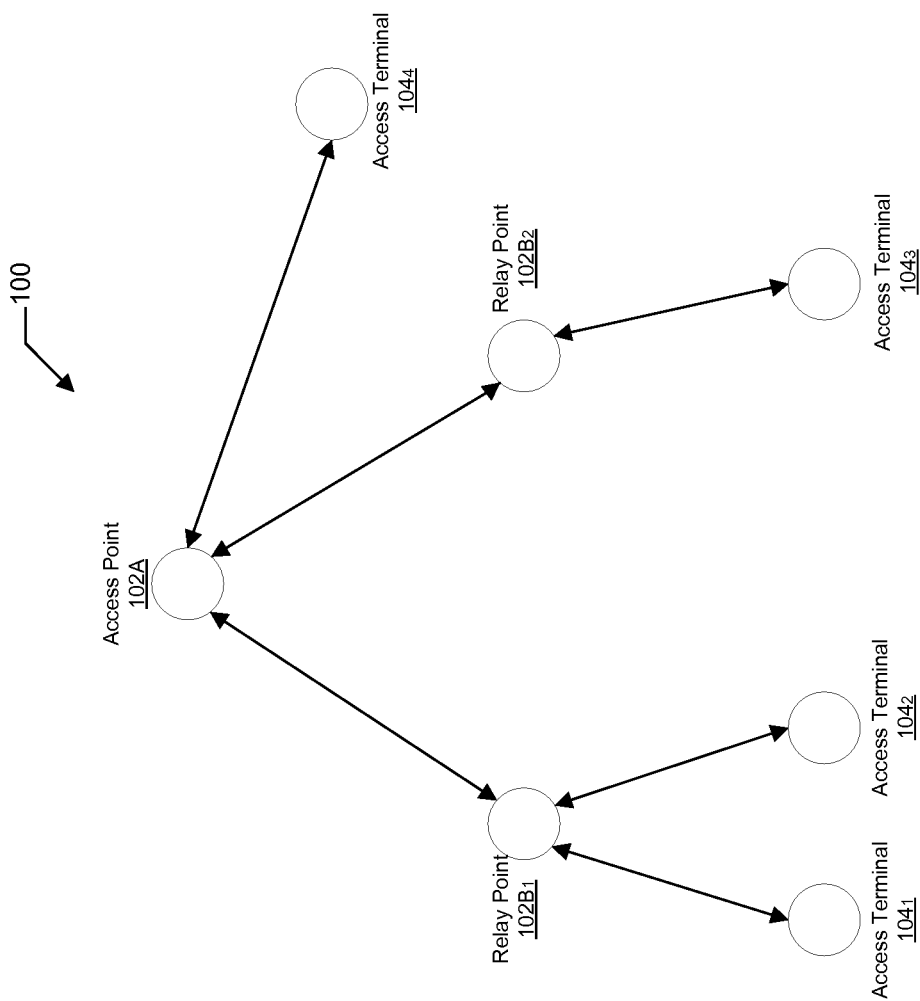
FIG. 1 is a conceptual diagram illustrating an example of a wireless network.

FIG. 1 is a conceptual diagram illustrating an example of a wireless network 100. The wireless network 100 is shown with several wireless nodes, generally designated as wireless nodes 102 and access terminals 104. A wireless node may receive, transmit, or both. In the discussion that follows, the term "receiving node" may be used to refer to a wireless node that is receiving and the term "transmitting node" may be used to refer to a wireless node that is transmitting. These designations do not imply that the wireless node is incapable of performing both transmit and receive functions.

A wireless node may function as an access point, a relay point, an access terminal, or any combination thereof. In the example of a wireless network 100 shown in FIG. 1, a cluster of the wireless nodes 102 function together to provide backhaul services to a number of access terminals 104. The cluster includes a wireless node 102A that functions as an access point by providing a backhaul connection to a network 100 (e.g., a WWAN such as a cellular network, a WLAN, an ISP, the Internet, etc.). This wireless node 102A, however, may function as a relay point for other access points not shown in FIG. 1, or provide a relay function in response to a dynamic reconfiguration of the wireless network 100. The cluster also includes two wireless nodes $102B_1$ and $102B_2$ that function as relay points to connect the access terminals 104 to the access point 102A. Although not shown, these wireless nodes $102B_1$ and $102B_2$ may also provide connectivity to other access points and relay points. The same wireless nodes $102B_1$ and $102B_2$ may function as access points for other clusters of wireless nodes in the network 100.

Four access terminals 104 are shown in FIG. 1. In this example, two access terminals $104_1$ and $104_2$ are connected to the access point 102A through the relay point $102B_1$, one access point $104_3$ is connected to the access point 102A through the relay point $102B_2$, and the remaining access point $104_4$ is connected directly to the access point 102A. An access terminal 104 may be any mobile user device capable of supporting radio communications with a wireless node 102 including, by way of example, a mobile or cellular phone, a personal digital assistant (PDA), a laptop computer, a digital audio device (e.g., an MP3 player), a game console, a digital camera, or other voice, data, audio, video, messaging, or multimedia device. In some applications, the access terminal 104 may also function as an access point and/or relay point for other wireless nodes in the network 100.

The air interface specification used or adopted to support the wireless network 100 can be based on any suitable multiple access technology that enables mobile subscribers to share the available radio resources. Examples of such multiple access technologies include Time Division Multiple Access (TDMA), Frequency Division Multiple Access (FDMA), CDMA, Wideband CDMA (W-CDMA), Orthogonal Frequency Division Multiple Access (OFDMA), or some combination thereof.

Figures 2A, 2B:
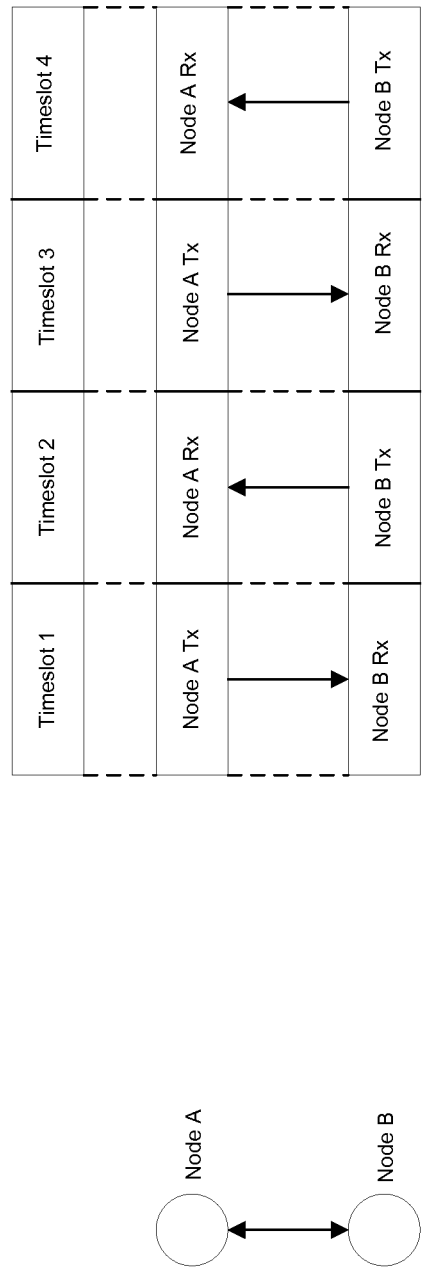
FIGS. 2A and 2B are conceptual diagrams illustrating examples of content flow associated with transmit and receive timeslots in a single hop communication.

An example will now be presented for a wireless network 100 that uses a TDMA air interface protocol. FIGS. 2A and 2B are conceptual diagrams showing content flows associated with transmit and receive timeslots in a single hop communication. Referring to FIG. 2A, content is transmitted from a wireless node A to a wireless node B. The wireless nodes A and B are allowed to transmit and receive during certain timeslots. By way of example, referring to FIG. 2B, the wireless node A may transmit during odd numbered timeslots and the wireless node B may transmit during even numbered timeslots. Conversely, the wireless node A may receive during even numbered timeslots and the wireless node B may receive during odd numbered timeslots.

In some implementations, multiple channels may be established in each timeslot. By way of example, in a hybrid TDMA/FDMA scheme, several frequency bands may be used within each timeslot to support simultaneous communications with multiple wireless nodes. In another example, several spreading codes may be used in a hybrid TDMA/CDMA scheme, thus enabling simultaneous communications during a single timeslot with the content for each communication being spread with a different code. Those skilled in the art will readily understand how to best divide up the radio resources using various multiple access technologies suitable for any particular application.

Returning to FIG. 1, each wireless node may have multiple downlink connections. In this configuration, each wireless node with multiple downlink connections may need to coordinate the sharing of radio resources between the downstream wireless nodes (e.g., frequency bands, spreading codes, etc.). By way of example, the access point 102A allocates available radio resources between the access terminal $104_4$ and the two relay points $102B_1$ and $102B_2$, and the relay point $102B_1$ allocates available radio resources between the two access terminals $104_1$ and $104_2$. In this example, the access point 102A and the relay point $102B_1$ may employ a scheduling algorithm to allocate radio resources. The scheduling algorithm may be as simple as a first-come first-serve process. Alternatively, a channel-dependent algorithm may be used to take advantage of favorable channel conditions. A simpler best effort scheduling algorithm may be used based on a fairness, whereby the wireless node for each downlink connection is given equal bandwidth, or in the case where there are a large number of wireless nodes with a downlink connection, a round-robin process in which the bandwidth is cycled between the wireless nodes in a fair way. Those skilled in the art will be readily able to determine an appropriate scheduling algorithm for any particular application of a wireless network.

Figure 3A:
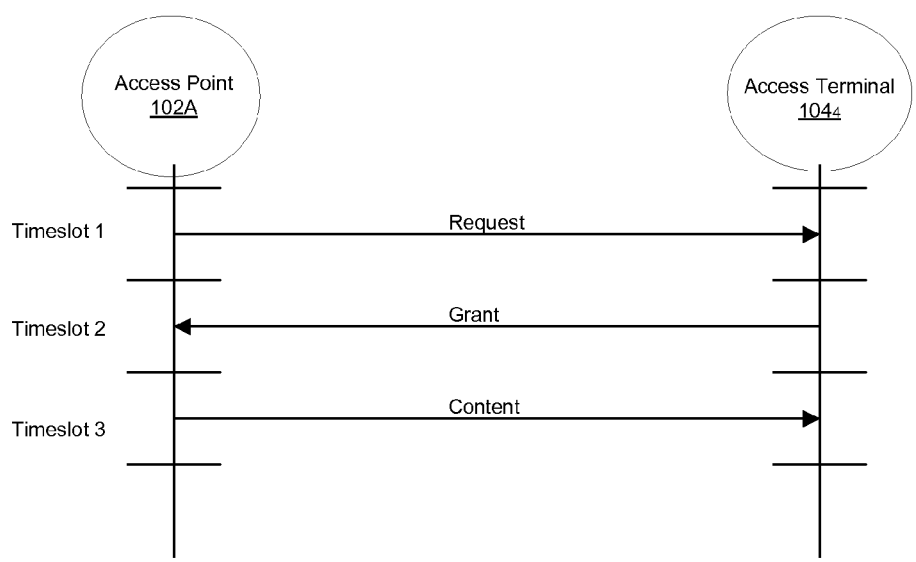
FIGS. 3A and 3B are conceptual diagrams illustrating examples of call flows associated with the timing relationship between a transmitting and receiving node in a single hop communication.
Figure 3B:
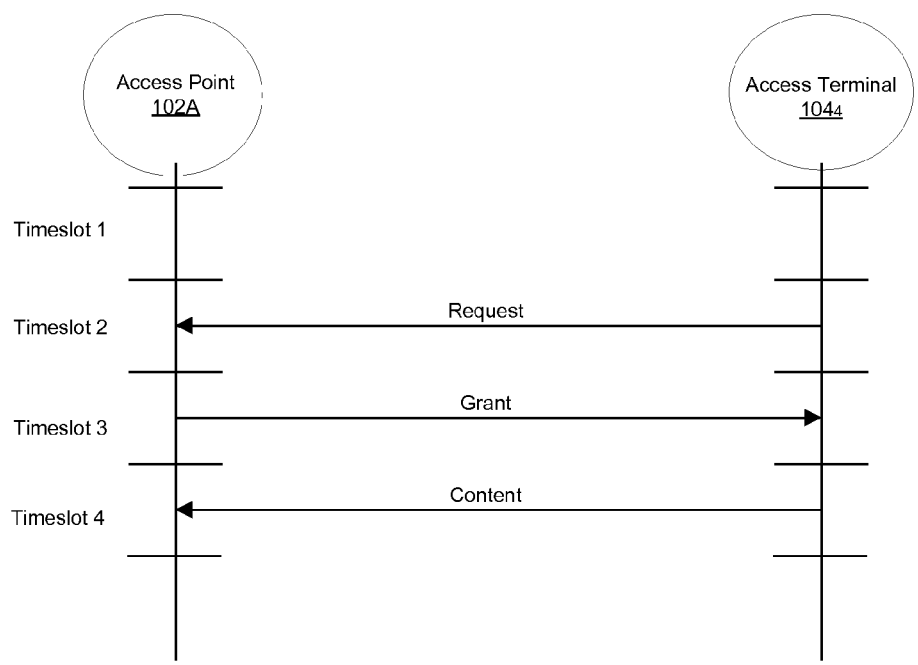

FIGS. 3A and 3B are call flow diagrams illustrating an example of the timing relationship between a transmitting and receiving node in a single hop communication. Referring to FIG. 3A, the transmitting node is the access point 102A in FIG. 1 and the receiving node is the access terminal $104_4$ in FIG. 1. A request/grant scheme is used to coordinate communications between the access point 102A and the access terminal $104_4$. By way of example, when the access point 102A wishes to transmit to the access terminal $104_4$ on the downlink, the access point 102A transmits a request during one of its transmit time slots (e.g., timeslot 1). The request includes a specified allocation of radio resources that the access point 102A intends to transmit on (e.g., frequency bands, spreading codes, etc.).

The access terminal $104_4$ receives the request during its corresponding receive timeslot. In response to the request, the access terminal $104_4$ may transmit a grant to the access point 102A during one of its transmit timeslots (e.g., timeslot 2). Here, the access terminal $104_4$ may grant the request for all or a portion of the radio resources requested. By way of example, the access terminal $104_4$ may grant the request to transmit only on the requested frequency bands that have recently exhibited a relatively low level of interference.

The grant may also include additional information such as the channel quality for packet format and data rate selection by the access point 102A. The channel quality information may comprise a channel quality indicator (CQI). A CQI may be computed by making use of a performance metric, such as the signal-to-noise ratio (SNR), signal-to-interference plus noise ration (SINR), and so forth.

After receiving the grant during its corresponding receive timeslot, the access point 102A transmits the content to the access terminal $104_4$ during one of its transmit timeslots (e.g., timeslot 3). The access terminal $104_4$ will thus receive the content during its corresponding receive timeslot.

Referring to FIG. 3B, the transmitting node is the access terminal $104_4$ in FIG. 1 and the receiving node is the access point 102A in FIG. 1. When the access terminal $104_4$ wishes to transmit to the access point 102A on the uplink, the access terminal $104_4$ transmits a request during one of its transmit time slots (e.g., timeslot 2). The request may include the buffer status (i.e., the quantity of content to be transmitted) and the quality of service (QoS) requirements.

The access point 102A receives the request during its corresponding receive timeslot. In response to the request, the access point 102A may transmit a grant to the access point 102A during one of its transmit timeslots (e.g., timeslot 3). The grant includes a specified allocation of radio resources for the access terminal $104_4$ to use to transmit. The grant may also include additional information such as packet format and data rate for the transmission.

After receiving the grant during its corresponding receive timeslot, the access terminal $104_4$ transmits the content to the access point 102A during one of its transmit timeslots (e.g., timeslot 4). The access point 102A will thus receive the content during its corresponding receive timeslot.

Figure 4B:
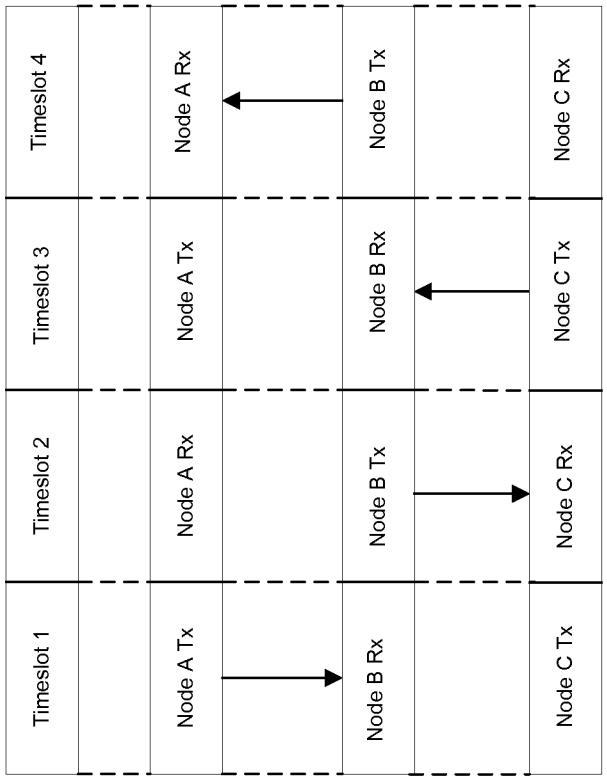
FIGS. 4A and 4B are conceptual diagrams illustrating examples of content flow associated with transmit and receive timeslots in a multiple hop communication.
Figure 4A:
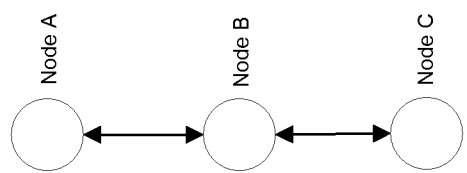

FIGS. 4A and 4B are conceptual diagrams illustrating content flow associated with transmit and receive timeslots in a multiple hop communication. Referring to FIG. 4A, content is transmitted from a wireless node A to a wireless node B and then to a wireless node C. As explained earlier in connection with a single hop communication, the wireless nodes are allowed to transmit and receive during certain timeslots. By way of example, referring to FIG. 4B, the wireless nodes A and C may transmit during odd numbered timeslots and the wireless node B may transmit during even numbered timeslots. Conversely, the wireless nodes A and C may receive during even numbered timeslots and the wireless node B may receive during odd numbered timeslots.

Figure 5A:
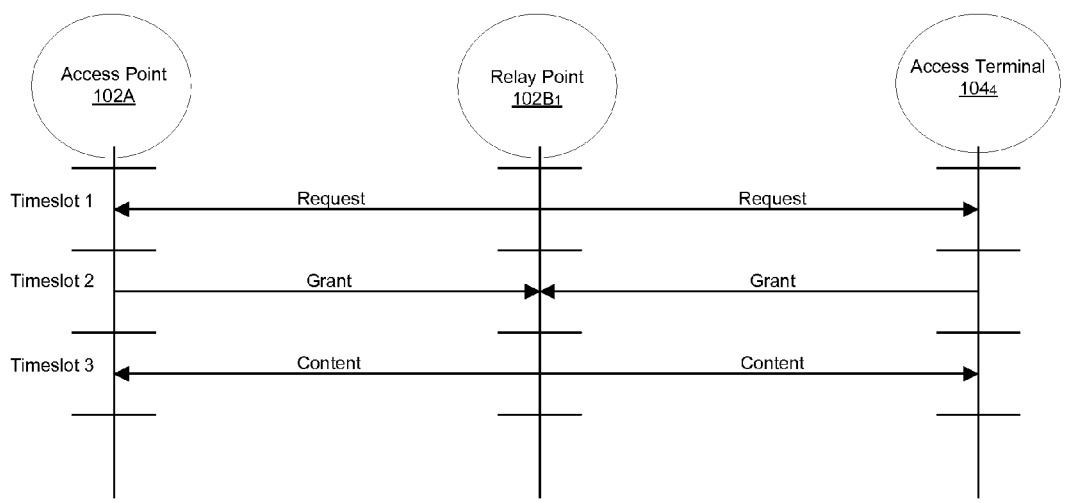
FIGS. 5A and 5B are conceptual diagrams illustrating examples of call flows associated with the timing relationship between two wireless nodes engaged in a multiple hop communication through an intermediate wireless node.
Figure 5B:
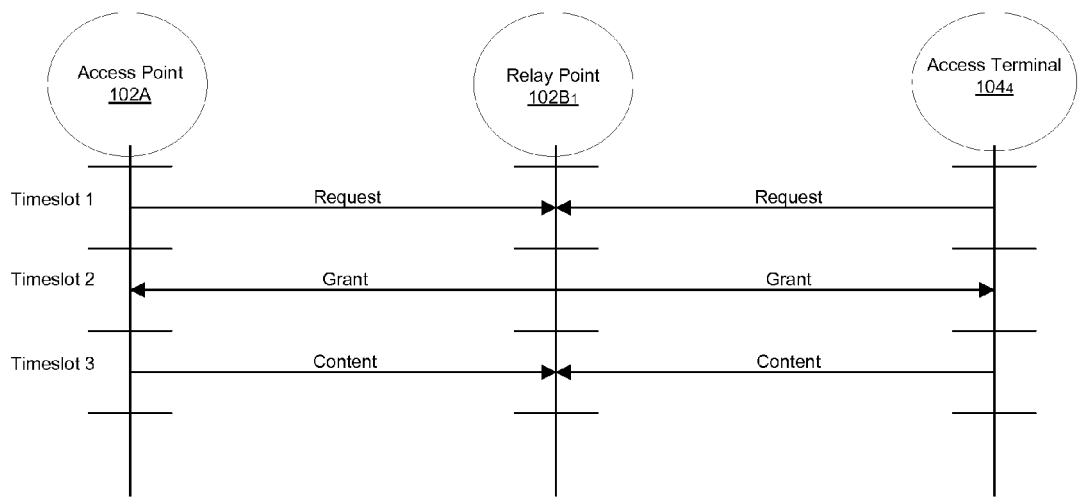

An example will now be presented with reference to FIGS. 5A and 5B. FIGS. 5A and 5B are call flow diagrams illustrating an example of the timing relationship between two wireless nodes engaged in a multiple hop communication through an intermediate wireless node. In this example, the access point 102A is in communication with the access terminal $104_1$ through the relay point $102B_1$ (see FIG. 1). To increase throughput and efficiently utilize the available bandwidth, the relay point $102_1$ may be configured to communicate simultaneously with the access point 102A and the access terminal $104_1$. In order to communicate simultaneously, the radio resources must be allocated to the relay point $102_1$ in way that maintains orthogonality on both the uplink and downlink. The problem is that the relay point $102B_1$ allocates radio resources to the access terminal $104_1$ in the downlink transmit request in timeslot 1, but has no way to ensure that the access point 102A does not allocate overlapping radio resources to it in timeslot 2. This problem may be solved by modifying the uplink transmit request to include a set of radio resources that are not being used by the relay point $102B_1$ on the downlink transmission.

Referring to FIG. 5A, when the relay point $102B_1$ wishes to simultaneously transmit to the access terminal $104_1$ on the downlink and the access point 102A on the uplink, its sends a request to each during one of its transmit time slots (e.g., timeslot 1). The requests may be sent on separate control channels. The request to the access terminal $104_1$ includes a specified allocation of radio resources that the relay point $102B_1$ intends to transmit on (e.g., frequency bands, spreading codes, etc.). The request to the access point 102A includes the buffer status, the QoS requirements, and a specified allocation of radio resources that the relay point $102B_1$ would like to transmit on. The specified allocation of radio resources are selected by the relay point $102B_1$ from those that have not been allocated for the downlink transmission to the access terminal $104_1$.

In some implementations, the specified allocation of radio resources selected by the relay point $102B_1$ is from a set of radio resources identified by the access point 102A in an earlier transmission. In these implementations, the access point 102A may divide the radio resources into multiple sets, one set for each downstream connection. Each downstream wireless node that is providing a relay function may select an allocation of radio resources from its set to specify in an uplink transmission request to the access point 102A.

The access terminal $104_1$ receives the downlink transmission request from the relay point $102B_1$ during its corresponding receive timeslot (e.g., timeslot 1). In response to the request, the access terminal $104_1$ may transmit a grant to the relay point $102B_1$ during one of its transmit timeslots (e.g., timeslot 2) on a control channel between the two. Here, the access terminal $104_1$ may grant the request for all or a portion of the radio resources requested. The grant may also include additional information such as the channel quality for packet format and data rate selection by the relay point $102B_1$.

The access point 102A receives the uplink transmission request during its corresponding receive timeslot (e.g., timeslot 1). In response to the request, the access point 102A designates at least a portion of the specified allocation of radio resources in the request for the uplink transmission. The designated portion of the specified allocation of radio resources may be based a variety of factors. By way of example, the relay point $102B_1$ may designate all or a portion of the radio resources specified by the access terminal $104_1$ based on the QoS requirements for the access terminal $104_1$ and/or the current loading on the relay point $102B_1$. The access point 102A transmits a grant to the relay point $102B_1$ during one of its transmit timeslots (e.g., timeslot 2) on a control channel that confirms the allocation of radio resources specified by the relay point $102B_1$ or identifies the designated portion of the specified radio resources. The grant may also include additional information such as packet format and data rate for the transmission.

After receiving the grant from both the access terminal $104_1$ and the access point 102A during its corresponding receive timeslot (e.g., timeslot 2), the relay point $102B_1$ simultaneously transmits content to the access terminal $104_1$ and the access point 102A during one of its transmit timeslots (e.g., timeslot 3). The access terminal $104_1$ and the access point 102A will thus receive the content during their respective corresponding receive timeslots (e.g., timeslot 3).

Referring to FIG. 5B, when the access point 102A wishes to transmit to the relay point $102B_1$ on the downlink, the access point 102A transmits a request during one of its transmit time slots (e.g., timeslot 1). The request includes a specified allocation of radio resources that the access point 102A intends to transmit on.

When the access terminal $104_1$ wishes to transmit to the relay point $102B_1$ on the uplink, the access terminal $104_1$ transmits a request during one of its transmit time slots (e.g., timeslot 1). The request includes the buffer status and the quality of service (QoS) requirements.

The relay point $102B_1$ receives both requests during its corresponding receive timeslot (e.g., timeslot 1). In response to the downlink transmission request from the access point 102A, the relay point $102B_1$ may transmit a grant to the access point 102A during one of its transmit timeslots (e.g., timeslot 2). Here, the relay point $102B_1$ may grant the request for all or a portion of the radio resources requested. The grant may also include additional information such as the channel quality for packet format and data rate selection by the access point 102A.

In response to the uplink transmission request from the access terminal $104_1$, the relay point $102B_1$ may transmit a grant to the access terminal $104_1$ during one of its transmit timeslots (e.g., timeslot 2). The grant includes a specified allocation of radio resources for the access terminal $104_1$ to use to transmit. The specified allocation of radio resources for the access terminal $104_1$ should be different than those allocated to it by the access point 102A one timeslot earlier. The grant may also include additional information such as packet format and data rate for the transmission.

After receiving both grants during its corresponding receive timeslot (e.g., timeslot 2), the relay point $102B_1$ the access point 102A and the access terminal $104_1$ simultaneously transmit content to the relay point $104_1$ during one of their respective transmit timeslots (e.g., timeslot 3). The relay point 102B will thus receive the content during its corresponding receive timeslot (e.g., timeslot 3).

Although the various concepts just presented were described in the context of a relay point supporting a multiple hop communication between two wireless nodes, those skilled in the art will readily appreciate that these concepts may be extended to a relay point that supports a simultaneous uplink and downlink transmissions to two wireless nodes that are not communicating with one another. Returning to FIG. 1 for an example, the relay point $102B_1$ may transmit content from the access terminal $104_1$ to the access point 102A, while simultaneously transmitting content from the access point 102A to another access terminal $104_2$.

Figure 6:
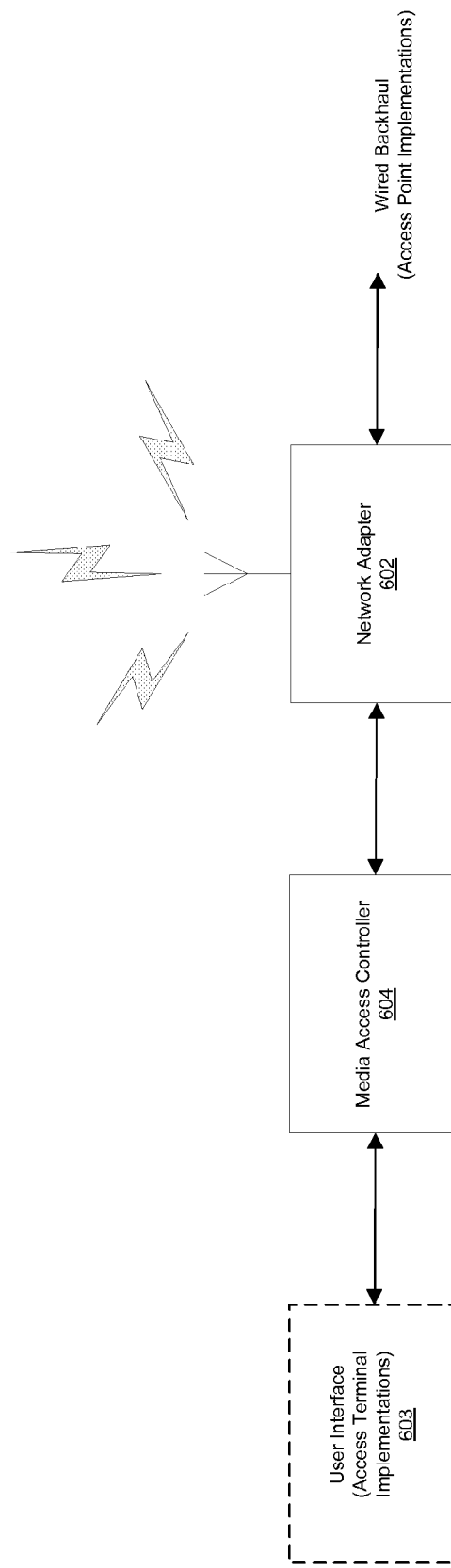
FIG. 6 is a block diagram illustrating an example of the functionality of a wireless node.

FIG. 6 is a block diagram illustrating an example of the functionality of a wireless node. The following descriptive is informative in nature and broadly defines the functionality of each block. Only the pertinent functionality to various concepts described throughout this disclosure will be described. Those skilled in the art will recognize that these functional blocks can provide other functionality that is not described herein. In this example, the wireless node 102 includes two functional blocks: a wireless network adapter 602 and a media access controller 604.

The wireless node may be an access point. In a wireless node that serves as an access point, a network adapter 602 maintains a wireless downlink connection with a first node to allow the media access controller 604 to communicate with a second node. The first node may be a relay point and the second node an access terminal, however, other downlink configurations may be supported. The network adapter 602 in the access point also maintains a wired backhaul connection to the network.

The wireless node may be an access terminal. In a wireless node that serves as an access terminal, the network adapter 602 maintains a wireless uplink connection with a first node to allow the media access controller 604 to communicate with a second node. A user interface 603 is used to control the content communicated with the second node. The first node may be a relay point and the second node an access point, however, other uplink configurations may be supported.

The functionality of the wireless node described above in connection with an access point and access terminal may be implemented in a relay point. In this configuration, the network adapter 602 may be used to maintain either an uplink or downlink connection with a first node to allow the media access controller 604 to communicate with a second node. By way of example, the network adapter 602 may maintain an uplink connection with another relay point to allow the media access controller 604 to communicate with an access point. Alternatively, or in addition to, the network adapter 602 may maintain a downlink connection with another relay point to allow the media access controller 604 to communicate with an access terminal. As those skilled in the art will appreciate, other uplink and downlink configuration may be supported by the network adapter 602.

The network adapter 602 provides both a receiver function and transmitter function. The receiver function includes demodulating a wireless signal and retrieving content carried by the signal. The transmitting function includes modulating a carrier with content. The wireless network 602 provides various functions such as RF front-end processing, ADC, timing and frequency estimation, channel estimation, turbo coding etc. In summary, the wireless network adapter 602 provides the complete physical layer implementation of the wireless node 202.

The media access controller 604 is used to control access to the wireless medium. It uses a scheduling algorithm to accommodate the current functionality of the wireless node (e.g., access point, relay point, access terminal). The media access controller 604 is responsible for scheduling communications between other wireless nodes using the request/grant scheme discussed earlier.

The media access controller 604 may be configured to support the wireless downstream connection maintained by the network adapter 602. In this configuration, the media access controller 604 receives a transmission request from the first node that includes a specified allocation of radio resources. The specified radio resources received in the transmission request from the first node may include frequency assignments, code spreading assignments, and other types of radio resources. The specified radio resources may be from an assignment of radio resources sent earlier by the media access controller 604 to the first node. In response to this request, the media access controller 604 designates at least a portion of the specified radio resources. Alternatively, or in addition to, the media access controller 604 may designate additional radio resources not specified by the first node. The designation may be based on a variety of parameters including, by way of example, quality of service requirements and/or loading. The designated radio resources are communicated to the first node in a grant message.

The media access controller 604 may also be configured to support the wireless upstream connection maintained by the network adapter 602. In this configuration, the media access controller 604 sends to the first node a request to communicate using a specified allocation of radio resources. The specified radio resources received in the transmission request from the first node may include frequency assignments, code spreading assignments, and other types of radio resources. In response to the request, the media access controller 604 receives from the first node a grant to communicate using at least a portion of the specified allocation of radio resources.

Figure 7A:
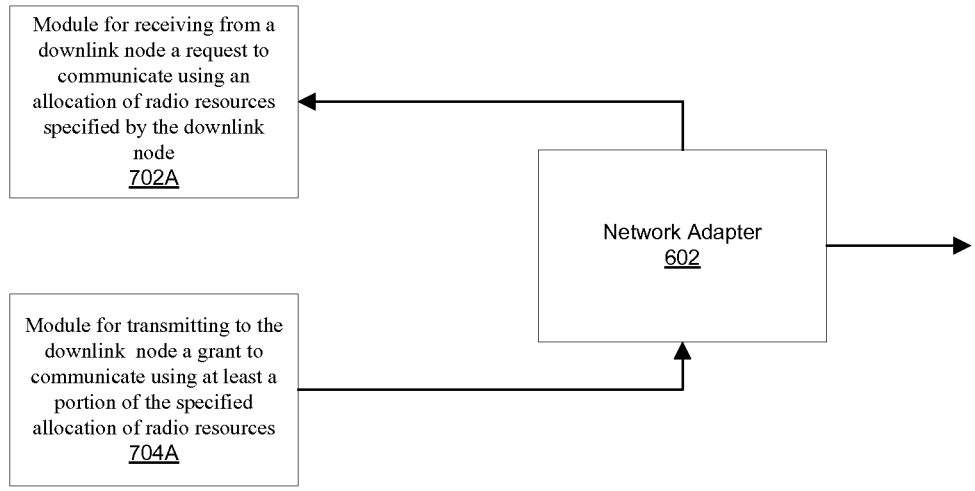
FIGS. 7A and 7B are block diagrams illustrating examples of the functionality of a media access controller.

FIG. 7A is a block diagram illustrating an example of the functionality of a media access controller with a downlink connection. The media access controller includes a module 702A for receiving from a downlink node a request to communicate using an allocation of radio resources specified by the downlink node, and a module 704A for transmitting to the downlink node a grant to communicate using at least a portion of the specified allocation of radio resources.

Figure 7B:
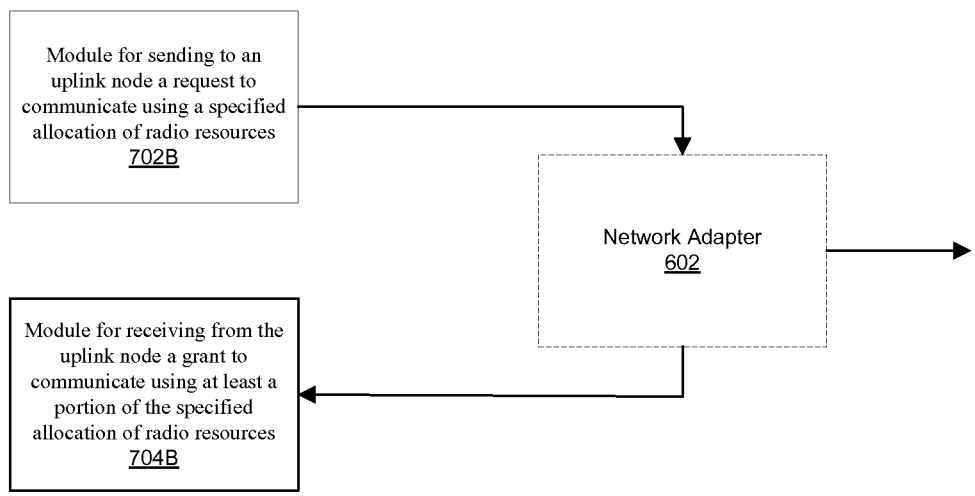

FIG. 7B is a block diagram illustrating an example of the functionality of a media access controller with an uplink connection. The media access controller includes a module 702B for sending to an uplink node a request to communicate using a specified allocation of radio resources, and a module 704B for receiving from the uplink node a grant to communicate using at least a portion of the specified allocation of radio resources.

The various illustrative logical blocks, modules, and circuits described in connection with the aspects disclosed herein may be implemented within or performed by an integrated circuit ("IC"), an access terminal, an access point or relay point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The code or instructions may be embodied in one or more machine-readable media to support software applications. Software shall be construed broadly to mean instructions, programs, code, or any other electronic media content whether referred to as software, firmware, middleware, microcode, hardware description language, or otherwise. Machine-readable media may include storage integrated with a processor, such as might be the case with an ASIC. Machine-readable media may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system. Moreover, in some aspects any suitable computer-program product may comprise a computer-readable medium or machine-readable medium comprising codes relating to one or more of the aspects of the disclosure. In some aspects a computer program product may comprise packaging materials.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communications, comprising:
   receiving, at an apparatus, from a downlink node a request to communicate with the apparatus using an allocation of radio resources specified by the downlink node, wherein the downlink node is in a downlink direction relative to the apparatus;
   receiving, at the apparatus, from an uplink node a request to communicate with the apparatus using an allocation of radio resources specified by the uplink node, wherein the uplink node is in an uplink direction relative to the apparatus;
   designating at least a portion of the allocation of radio resources specified by the downlink node for communication by the downlink node based on quality of service requirements;
   transmitting, from the apparatus, to the downlink node a grant to communicate with the apparatus using the designated portion of the allocation of radio resources; and
   transmitting, from the apparatus, to the uplink node a grant to communicate with the apparatus using at least a portion of the allocation of radio resources specified by the uplink node, wherein the uplink node and the downlink node are engaged in a multiple hop communication with one another through the apparatus, and wherein the uplink direction is towards an access point and the downlink direction is away from the access point.

2. The method of claim 1 further comprising designating only a portion of the allocation of radio resources specified by the downlink node for communication, and wherein the grant transmitted to the downlink node comprises a grant to communicate using the designated portion of the specified allocation of radio resources.

3. The method of claim 1 further comprising designating at least a portion of the allocation of radio resources specified by the downlink node for communication by the downlink node based on loading, and wherein the grant transmitted to the downlink node comprises a grant to communicate using the designated portion of the specified allocation of radio resources.

4. The method of claim 1 wherein the allocation of radio resources specified by the downlink node comprises a frequency assignment.

5. The method of claim 1 wherein the allocation of radio resources specified by the downlink node comprises a spreading code assignment.

6. The method of claim 1 further comprising providing to the downlink node an assignment of radio resources, and wherein the allocation of radio resources specified by the downlink node's request is from the assignment of radio resources.

7. The method of claim 6 further comprising providing a second assignment of radio resources to a second downlink node.

8. The method of claim 1 wherein the grant transmitted to the downlink node includes additional radio resources not specified by the downlink node for communicating.

9. The method of claim 1 wherein the communication with the downlink node comprises receiving from the downlink node.

10. The method of claim 1 wherein the communication with the downlink node comprises transmitting to the downlink node.

11. The method of claim 1 wherein the uplink node comprises an access point and the downlink node comprises an access terminal.

12. The method of claim 1, wherein the portion of the allocation of radio resources in the grant to the downlink node is different from the portion of the radio resources in the grant to the uplink node, such that the communication between the apparatus and the uplink node is orthogonal to the communication between the apparatus and the downlink node.

13. A method of wireless communications, comprising:
    sending, from an apparatus, to an uplink node a request to communicate with the uplink node using a specified allocation of radio resources, wherein the uplink node is in an uplink direction relative to the apparatus, wherein the request includes a quality of service requirement for communication with the uplink node;
    sending, from the apparatus, to a downlink node a request to communicate with the downlink node using a specified allocation of radio resources, wherein the downlink node is in a downlink direction relative to the apparatus;
    receiving, at the apparatus, from the downlink node a grant to communicate with the downlink node using at least a portion of the allocation of radio resources specified in the request to the downlink node; and
    receiving, at the apparatus, from the uplink node a grant to communicate with the uplink node using at least a portion of the allocation of radio resources specified in the request to the uplink node, wherein the uplink node and the downlink node are engaged in a multiple hop communication with one another through the apparatus, and wherein the uplink direction is towards an access point and the downlink direction is away from the access point.

14. The method of claim 13 wherein the grant received from the uplink node comprises a grant to communicate using the allocation of radio resources specified in the request to the uplink node.

15. The method of claim 13 wherein the grant received from the uplink node comprises a grant to communicate using only a portion of the allocation of resources specified in the request to the uplink node.

16. The method of claim 13 wherein the allocation of radio resources specified in the request to the uplink node comprises a frequency assignment.

17. The method of claim 13 wherein the allocation of radio resources specified in the request to the uplink node comprises a spreading code assignment.

18. The method of claim 13 wherein the radio resources for the uplink node comprises a plurality of channels, and wherein the allocation of radio resources is specified in the request to the uplink node by a channel identifier that describes one or more of the channels.

19. The method of claim 13 wherein the radio resources for the uplink node comprises a plurality of channels, and wherein the allocation of radio resources is specified in the request to the uplink node by a channel identifier that describes a subset of one of the channels.

20. The method of claim 13 wherein the allocation of radio resources specified in the request to the uplink node is contiguous.

21. The method of claim 13 wherein the allocation of radio resources specified in the request to the uplink node is non-contiguous.

22. The method of claim 13 wherein the uplink node comprises an access point and the downlink node comprises an access terminal.

23. The method of claim 13, wherein, the specified allocation of resources in the request to communicate with the downlink node is different from the specified allocation of resources in the request to communicate with the uplink node, such that the communication between the apparatus and the uplink node is orthogonal to the communication between the apparatus and the downlink node.

24. An apparatus for wireless communications, comprising:
   a media access controller configured to:
      receive from a downlink node a request to communicate with the apparatus using an allocation of radio resources specified by the downlink node, wherein the downlink node is in a downlink direction relative to the apparatus,
      receive from an uplink node a request to communicate with the apparatus using an allocation of radio resources specified by the uplink node, wherein the uplink node is in an uplink direction relative to the apparatus,
      designate at least a portion of the allocation of radio resources specified by the downlink node for communication by the downlink node based on quality of service requirements,
      transmit to the downlink node a grant to communicate with the apparatus using the designated portion of the allocation of radio resources, and
      transmit to the uplink node a grant to communicate with the apparatus using at least a portion of the allocation of radio resources specified by the uplink node, wherein the uplink node and the downlink node are engaged in a multiple hop communication with one another through the apparatus, and wherein the uplink direction is towards an access point and the downlink direction is away from the access point.

25. The apparatus of claim 24 wherein the media access controller is further configured to designate only a portion of the allocation of radio resources specified by the downlink node for communication, and wherein the grant to be transmitted to the downlink node comprises a grant to communicate using the designated portion of the specified allocation of radio resources.

26. The apparatus of claim 24 wherein the media access controller is further configured to designate at least a portion of the allocation of radio resources specified by the downlink node for communication by the downlink node based on loading, and wherein the grant to be transmitted to the downlink node comprises a grant to communicate using the designated portion of the specified allocation of radio resources.

27. The apparatus of claim 24 wherein the allocation of radio resources specified by the downlink node comprises a frequency assignment.

28. The apparatus of claim 24 wherein the allocation of radio resources specified by the downlink node comprises a spreading code assignment.

29. The apparatus of claim 24 wherein the media access controller is further configured to provide to the downlink node an assignment of radio resources, and wherein the allocation of radio resources specified by the downlink node's request is from the assignment of radio resources.

30. The apparatus of claim 29 wherein the media access controller is further configured to provide a second assignment of radio resources to a second downlink node.

31. The apparatus of claim 24 wherein the grant to be transmitted to the downlink node includes additional radio resources not specified by the downlink node for communicating.

32. The apparatus of claim 24 wherein the media access controller is further configured to communicate with the downlink node by receiving from the downlink node.

33. The apparatus of claim 24 wherein the media access controller is further configured to communicate with the downlink node by transmitting to the downlink node.

34. The apparatus of claim 24 wherein the uplink node comprises an access point and the downlink node comprises an access terminal.

35. The apparatus of claim 24, wherein the portion of the allocation of radio resources in the grant to the downlink node is different from the portion of the radio resources in the grant to the uplink node, such that the communication between the apparatus and the uplink node is orthogonal to the communication between the apparatus and the downlink node.

36. An apparatus for wireless communications, comprising:
   a media access controller configured to:
      send to an uplink node a request to communicate with the uplink node using a specified allocation of radio resources, wherein the uplink node is in an uplink direction relative to the apparatus, wherein the request includes a quality of service requirement for communication with the uplink node,
      send to a downlink node a request to communicate with the downlink node using a specified allocation of radio resources, wherein the downlink node is in a downlink direction relative to the apparatus,
      receive from the uplink node a grant to communicate with the uplink node using at least a portion of the allocation of radio resources specified in the request to the uplink node, and
      receive from the downlink node a grant to communicate with the downlink node using at least a portion of the allocation of radio resources specified in the request to the downlink node, wherein the uplink node and the downlink node are engaged in a multiple hop communication with one another through the apparatus, and wherein the uplink direction is towards an access point and the downlink direction is away from the access point.

37. The apparatus of claim 36 wherein the grant to be received from the uplink node comprises a grant to communicate using the allocation of radio resources specified in the request to the uplink node.

38. The apparatus of claim 36 wherein the grant to be received from the uplink node comprises a grant to communicate using only a portion of the allocation of resources specified in the request to the uplink node.

39. The apparatus of claim 36 wherein the allocation of radio resources specified in the request to the uplink node comprises a frequency assignment.

40. The apparatus of claim 36 wherein the allocation of radio resources specified in the request to the uplink node comprises a spreading code assignment.

41. The apparatus of claim 36 wherein the radio resources for the uplink node comprises a plurality of channels, and wherein the allocation of radio resources is specified in the request to the uplink node by a channel identifier that describes one or more of the channels.

42. The apparatus of claim 36 wherein the radio resources for the uplink node comprises a plurality of channels, and wherein the allocation of radio resources is specified in the request to the uplink node by a channel identifier that describes a subset of one of the channels.

43. The apparatus of claim 36 wherein the allocation of radio resources specified in the request to the uplink node is contiguous.

44. The apparatus of claim 36 wherein the allocation of radio resources specified in the request to the uplink node is non-contiguous.

45. The apparatus of claim 36 wherein the uplink node comprises an access point and the downlink node comprises an access terminal.

46. The apparatus of claim 36, wherein, the specified allocation of resources in the request to communicate with the downlink node is different from the specified allocation of resources in the request to communicate with the uplink node, such that the communication between the apparatus and the uplink node is orthogonal to the communication between the apparatus and the downlink node.

47. An apparatus for wireless communications, comprising:
    means for receiving from a downlink node a request to communicate with the apparatus using an allocation of radio resources specified by the downlink node, wherein the downlink node is in a downlink direction relative to the apparatus;
    means for receiving from an uplink node a request to communicate with the apparatus using an allocation of radio resources specified by the uplink node, wherein the uplink node is in an uplink direction relative to the apparatus;
    means for designating at least a portion of the allocation of radio resources specified by the downlink node for communication by the downlink node based on quality of service requirements;
    means for transmitting to the downlink node a grant to communicate with the apparatus using the designated portion of the allocation of radio resources; and
    means for transmitting to the uplink node a grant to communicate with the apparatus using at least a portion of the allocation of radio resources specified by the uplink node, wherein the uplink node and the downlink node are engaged in a multiple hop communication with one another through the apparatus, and wherein the uplink direction is towards an access point and the downlink direction is away from the access point.

48. The apparatus of claim 47 further comprising means for designating only a portion of the allocation of radio resources specified by the downlink node for communication, and wherein the grant to be transmitted to the downlink node comprises a grant to communicate using the designated portion of the specified allocation of radio resources.

49. The apparatus of claim 47 further comprising means for designating at least a portion of the allocation of radio resources specified by the downlink node for communication by the downlink node based on loading, and wherein the grant to be transmitted to the downlink node comprises a grant to communicate using the designated portion of the specified allocation of radio resources.

50. The apparatus of claim 47 wherein the allocation of radio resources specified by the downlink node comprises a frequency assignment.

51. The apparatus of claim 47 wherein the allocation of radio resources specified by the downlink node comprises a spreading code assignment.

52. The apparatus of claim 47 further comprising means for providing to the downlink node an assignment of radio resources, and wherein the allocation of radio resources specified by the downlink node's request is from the assignment of radio resources.

53. The apparatus of claim 52 further comprising means for providing a second assignment of radio resources to a second downlink node.

54. The apparatus of claim 47 wherein the grant to be transmitted to the downlink node includes additional radio resources not specified by the downlink node for communicating.

55. The apparatus of claim 47 wherein the communication with the downlink node comprises receiving from the first node.

56. The apparatus of claim 47 wherein the communication with the first node comprises transmitting to the first node.

57. The apparatus of claim 47 wherein the uplink node comprises an access point and the downlink node comprises an access terminal.

58. The apparatus of claim 47, wherein the portion of the allocation of radio resources in the grant to the downlink node is different from the portion of the radio resources in the grant to the uplink node, such that the communication between the apparatus and the uplink node is orthogonal to the communication between the apparatus and the downlink node.

59. An apparatus for wireless communications, comprising:
    means for sending to an uplink node a request to communicate with the uplink node using a specified allocation of radio resources, wherein the uplink node is in an uplink direction relative to the apparatus, wherein the request includes a quality of service requirement for communication with the uplink node;
    means for sending to a downlink node a request to communicate with the downlink node using a specified allocation of radio resources, wherein the downlink node is in a downlink direction relative to the apparatus;
    means for receiving from the downlink node a grant to communicate with the downlink node using at least a portion of the allocation of radio resources specified in the request to the downlink node; and
    means for receiving from the uplink node a grant to communicate with the uplink node using at least a portion of the allocation of radio resources specified in the request to the uplink node, wherein the uplink node and the downlink node are engaged in a multiple hop communication with one another through the apparatus, and wherein the uplink direction is towards an access point and the downlink direction is away from the access point.

60. The apparatus of claim 59 wherein the grant to be received from the first node comprises a grant to communicate using the allocation of radio resources specified in the request to the uplink node.

61. The apparatus of claim 59 wherein the grant to be received from the first node comprises a grant to communicate using only a portion of the allocation of resources specified in the request to the uplink node.

62. The apparatus of claim 59 wherein the allocation of radio resources specified in the request to the uplink node comprises a frequency assignment.

63. The apparatus of claim 59 wherein the allocation of radio resources specified in the request to the uplink node comprises a spreading code assignment.

64. The apparatus of claim 59 wherein the radio resources for the uplink node comprises a plurality of channels, and wherein the allocation of radio resources is specified in the request to the uplink node by a channel identifier that describes one or more of the channels.

65. The apparatus of claim 59 wherein the radio resources for the uplink node comprises a plurality of channels, and wherein the allocation of radio resources is specified in the request to the uplink node by a channel identifier that describes a subset of one of the channels.

66. The apparatus of claim 59 wherein the allocation of radio resources specified in the request to the uplink node is contiguous.

67. The apparatus of claim 59 wherein the uplink node comprises an access point and the downlink node comprises an access terminal.

68. The apparatus of claim 59, wherein, the specified allocation of resources in the request to communicate with the downlink node is different from the specified allocation of resources in the request to communicate with the uplink node, such that the communication between the apparatus and the uplink node is orthogonal to the communication between the apparatus and the downlink node.

69. A non-transitory machine-readable medium comprising instructions executable by one or more processors in a wireless node to:
   receive, at an apparatus, from a downlink node a request to communicate with the apparatus using an allocation of radio resources specified by the downlink node, wherein the downlink node is in a downlink direction relative to the apparatus;
   receive, at the apparatus, from an uplink node a request to communicate with the apparatus using an allocation of radio resources specified by the downlink node, wherein the uplink node is in an uplink direction relative to the apparatus;
   designate at least a portion of the allocation of radio resources specified by the downlink node for communication by the downlink node based on quality of service requirements;
   transmit to the downlink node a grant to communicate with the apparatus using the designated portion of the allocation of radio resources; and
   transmit to the uplink node a grant to communicate with the apparatus using at least a portion of the allocation of radio resources specified by the uplink node, wherein the uplink node and the downlink node are engaged in a multiple hop communication with one another through the apparatus, and wherein the uplink direction is towards an access point and the downlink direction is away from the access point.

70. The non-transitory machine-readable medium of claim 69 wherein the uplink node comprises an access point and the downlink node comprises an access terminal.

71. The non-transitory machine-readable medium of claim 69, wherein the portion of the allocation of radio resources in the grant to the downlink node is different from the portion of the radio resources in the grant to the uplink node, such that the communication between the apparatus and the uplink node is orthogonal to the communication between the apparatus and the downlink node.

72. A non-transitory machine-readable medium comprising instructions executable by a processing system in a wireless node to:
   send, from an apparatus, to an uplink node a request to communicate with the uplink node using a specified allocation of radio resources, wherein the uplink node is in an uplink direction relative to the apparatus, wherein the request includes a quality of service requirement for communication with the uplink node;
   send, from the apparatus, to a downlink node a request to communicate with the downlink node using a specified allocation of radio resources, wherein the downlink node is in a downlink direction relative to the apparatus;
   receive from the downlink node a grant to communicate with the downlink node using at least a portion of the allocation of radio resources specified in the request to the downlink node; and
   receive from the uplink node a grant to communicate with the uplink node using at least a portion of the allocation of radio resources specified in the request to the uplink node, wherein the uplink node and the downlink node are engaged in a multiple hop communication with one another through the apparatus, and wherein the uplink direction is towards an access point and the downlink direction is away from the access point.

73. The non-transitory machine-readable medium of claim 72 wherein the uplink node comprises an access point and the downlink node comprises an access terminal.

74. The non-transitory machine-readable medium of claim 72, wherein, the specified allocation of resources in the request to communicate with the downlink node is different from the specified allocation of resources in the request to communicate with the uplink node, such that the communication between the apparatus and the uplink node is orthogonal to the communication between the apparatus and the downlink node.

75. A relay point for wireless communications, comprising:
   a wireless network adapter configured to support radio communications with a downlink node and an uplink node; and
   a media access controller configured to:
      receive from the downlink node a request to communicate with the relay point using an allocation of radio resources specified by the downlink node, wherein the downlink node is in a downlink direction relative to the relay point,
      receive from the uplink node a request to communicate with the relay point using an allocation of radio resources specified by the uplink node, wherein the uplink node is in an uplink direction relative to the relay point,
      designate at least a portion of the allocation of radio resources specified by the downlink node for communication by the downlink node based on quality of service requirements;
      transmit to the downlink node a grant to communicate with the relay point using the designated portion of the allocation of radio resources, and
      transmit to the uplink node a grant to communicate with the relay point using at least a portion of the allocation of radio resources specified by the uplink node, wherein the uplink node and the downlink node are engaged in a multiple hop communication with one another through the relay point, and wherein the uplink direction is towards an access point and the downlink direction is away from the access point.

76. The relay point of claim 75 wherein the uplink node comprises an access point and the downlink node comprises an access terminal.

77. The relay point of claim 75, wherein the portion of the allocation of radio resources in the grant to the downlink node is different from the portion of the radio resources in the grant to the uplink node, such that the communication between the relay point and the uplink node is orthogonal to the communication between the relay point and the downlink node.

78. A relay point for wireless communications, comprising:
- a wireless network adapter configured to support radio communications with an uplink node; and
- a media access controller configured to:
  - send to a uplink node a request to communicate with the relay point using a specified allocation of radio resources, wherein the uplink node is in an uplink direction relative to the relay point, wherein the request includes a quality of service requirement for communication with the uplink node,
  - send to a downlink node a request to communicate with the relay point using a specified allocation of radio resources, wherein the downlink node is in a downlink direction relative to the relay point,
  - receive from the uplink node a grant to communicate with the relay point using at least a portion of the allocation of radio resources specified in the request to the uplink node, and
  - receive from the downlink node a grant to communicate with the relay point using at least a portion of the allocation of radio resources specified in the request to the downlink node, wherein the uplink node and the downlink node are engaged in a multiple hop communication with one another through the relay point, and wherein the uplink direction is towards an access point and the downlink direction is away from the access point.

79. The relay point of claim 78 wherein the uplink node comprises an access point and the downlink node comprises an access terminal.

80. The relay point of claim 78, wherein, the specified allocation of resources in the request to communicate with the downlink node is different from the specified allocation of resources in the request to communicate with the uplink node, such that the communication between the relay point and the uplink node is orthogonal to the communication between the relay point and the downlink node.

* * * * *